June 24, 1941.   C. E. NORTON   2,247,031
PIPE COUPLING
Filed Oct. 21, 1938   2 Sheets-Sheet 1
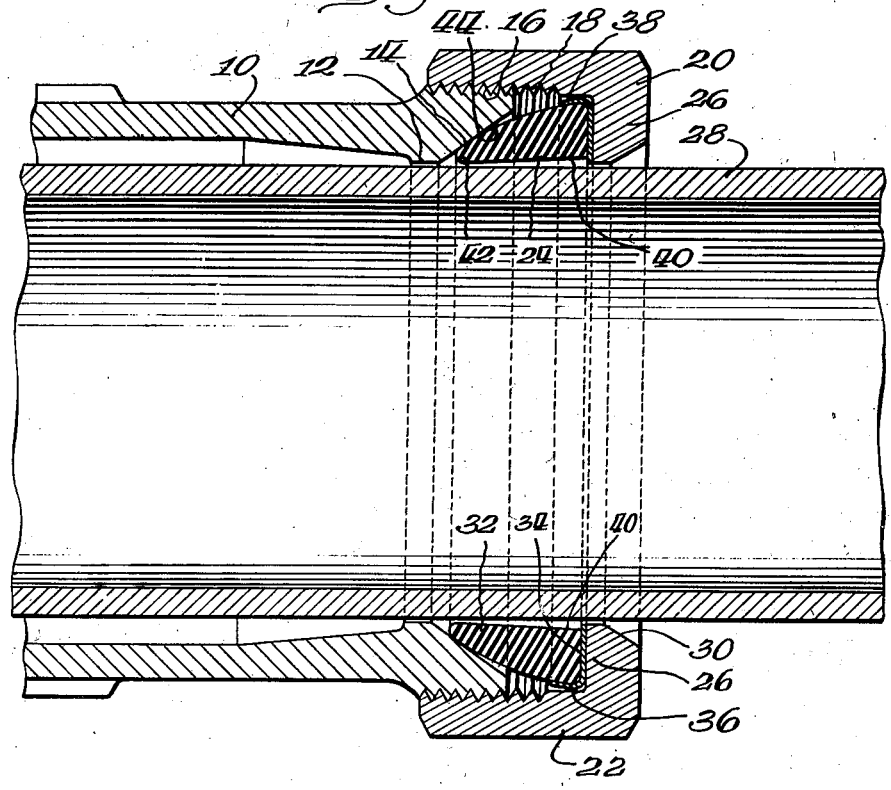
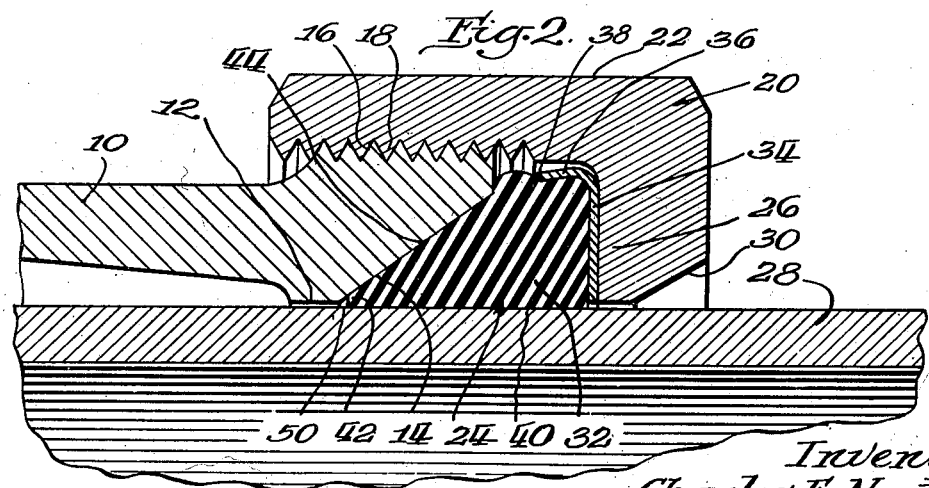

June 24, 1941.  C. E. NORTON  2,247,031
PIPE COUPLING
Filed Oct. 21, 1938   2 Sheets-Sheet 2
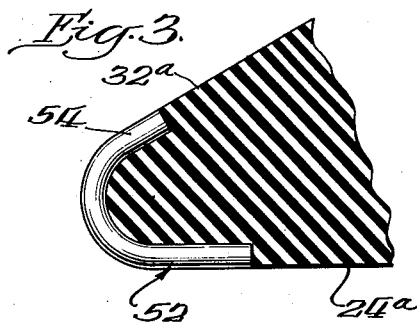
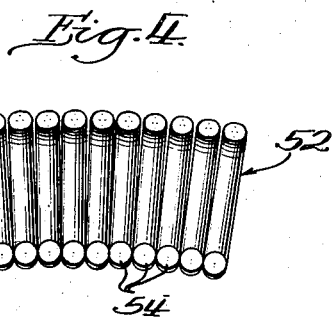
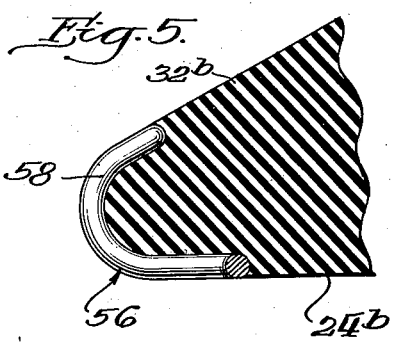
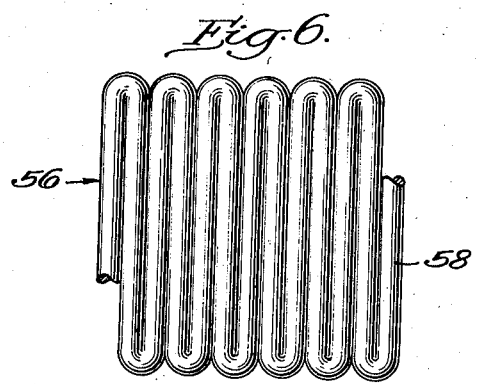
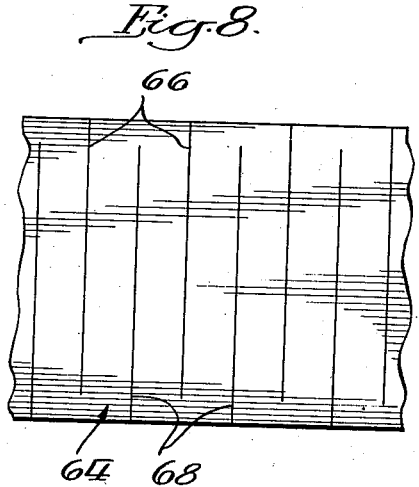
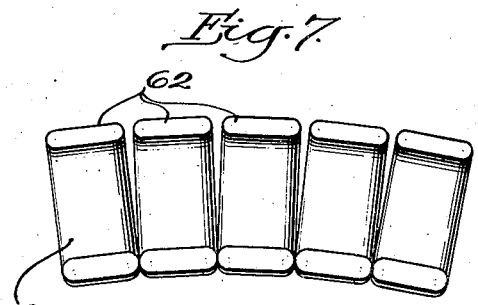
Inventor
Charles E. Norton
By Williams, Bradbury, McCaleb & Hinkle
Attys.

Patented June 24, 1941

2,247,031

UNITED STATES PATENT OFFICE 2,247,031

PIPE COUPLING

Charles E. Norton, Chicago, Ill., assignor to Norton-McMurray Manufacturing Company, Chicago, Ill., a corporation of Illinois Application October 21, 1938, Serial No. 236,136

3 Claims. (Cl. 285—166)

My invention pertains to pipe couplings.

An object of my invention is to provide a pipe coupling wherein an effective seal may be created by the exertion of only a small force to tighten the coupling.

Another object of my invention is to provide a pipe coupling which may be assembled to the end of one pipe section and into which the other pipe section can be easily inserted while the coupling is thus assembled.

Another object is to provide an improved pipe coupling which will form a perfect seal with the roughened exterior surface of a pipe section.

Another object is to provide an improved pipe coupling which will permit repeated connection and disconnection of the pipe sections without injury to the coupling.

Another object is to provide an improved pipe coupling which will be more durable than the couplings now in use.

Another object is to provide means for protecting the coupling against the deleterious effects of oil and other liquids without interfering with the efficiency of the coupling in effecting a fluid-tight seal.

Other objects and advantages will become apparent as the description proceeds.

In the drawings:

Figure 1 is a sectional view of one embodiment of my invention showing the coupling in assembled but non-sealing relationship;

Figure 2 is a partial sectional view similar to Figure 1 but showing the relationship of the parts when in sealing engagement with the pipe sections;

Figure 3 is a partial sectional view of a modified form of sealing ring incorporating a protective metal annulus;

Figure 4 is a view illustrating a portion of the protective annulus prior to its incorporation in the sealing ring;

Figure 5 is a view similar to Figure 3 but illustrating a sealing ring having a different type of protective metal annulus;

Figure 6 is a view illustrating the manner in which the metal annulus of Figure 5 is made;

Figure 7 is a view illustrating a part of a third type of metal annulus; and

Figure 8 is a view illustrating a step in the manufacture of a still different type of metal annulus.

Referring to Figures 1 and 2, it will be seen that I have illustrated therein a pipe section 10 having an internal rib 12 merging with a tapered surface 14 forming a portion of a true geometrical cone. That part of the pipe section 10 which surrounds the tapered surface 14 is provided with threads 16 designed for engagement by the complementary threads 18 of the clamping ring 20. The periphery 22 of the clamping ring 20 may be hexagonal or otherwise suitably formed for engagement with a wrench or other tool for rotating the clamping ring 20 relative to the pipe section 10.

A sealing ring 24 is confined between the tapered surface 14 and the inwardly directed flange 26 of the clamping member 20 and when the parts are loosely assembled, as in Figure 1, the end 28 of a complementary pipe section may readily be inserted or withdrawn, as is clearly indicated in this figure. It will be noted that the inwardly directed rib 12 is narrow in a longitudinal direction so that a relatively small clearance between the inner surface of this rib and the adjacent external surface of the pipe end 28 will permit substantial misalignment between the two pipe sections. In order to permit such misalignment wherever desirable, the inturned flange 26 of the clamping member 20 is so made that there is substantial clearance between the inner surface of this flange and the external surface of the pipe section 28. Furthermore, this flange 26 is chamfered as indicated at 30.

In Figures 1 and 2, the sealing ring 24 is illustrated as comprising a rubber portion 32 and a metal base 34. The base 34 is preferably formed of sheet metal and has a bent-over lip 36. The edge 38 of this lip is bent inwardly to grip the rubber portion 32 and thus hold the rubber portion and base in assembled relationship to permit them to be handled as a single unit.

The inner surface 40 of the rubber portion of the sealing ring is slightly conical, since I have found that the taper afforded this inner surface facilitates the insertion and removal of the pipe end 28 when the coupling is loosely assembled. The narrow edge of the rubber portion 32 is rounded as indicated at 42 and the outer surface 44 of this rubber portion is formed as a portion of a sphere.

A feature of my coupling resides in the fact that a workman can, with his hand alone, screw up the clamping ring 20 with sufficient force to obtain a fluid-tight seal. This is of particular advantage where it is desired to test a pipe line and possibly make changes therein before the couplings are permanently connected. With my invention the workman can quickly and without the use of tools screw up the couplings sufficiently to permit such a test and after the completion of the test, he can as quickly and easily disconnect the pipe sections and make any desired rearrangements therein. After the desired tests have been completed and the pipe line found satisfactory, the couplings can then be permanently tightened by means of the usual tools.

Referring particularly to Figure 1, it will be noted that when the coupling members are in the loosely assembled condition disclosed therein, the outer spherical surface of the sealing ring 24 engages the tapered surface 14 over a relatively narrow band adjacent the thin edge of the sealing ring, and that the inner surface of the sealing ring is spaced from the outer surface of the pipe section 28. When the clamping ring 20 is rotated by hand the thin edge of the sealing ring 24 is pressed inwardly against the outer surface of the pipe section 28 and a slightly broader band of the sealing ring engages the tapered surface 14. I have found that the spherical outer surface of the sealing ring 24 is peculiarly adapted for effecting a fluid-tight seal under light pressure and in spite of dirt or other particles of matter which may be interposed between the outer surface of the sealing ring and the tapered surface 14.

In Figure 2 I have shown a typical coupling in which the clamping ring 20 has been fully tightened. It will be noted in this figure that the rubber portion of the sealing ring 24 has been deformed so that it contacts with practically the entire tapered surface 14, and the entire inner surface of the rubber portion 32 is in engagement with the outer surface of the pipe portion 28. It will be further noted that the lip 36 of the base 34 is largely instrumental in preventing the rubber portion of the sealing ring from extending into the threads 18, and in this manner I protect the rubber portion of the sealing ring against injury and thus make it possible to repeatedly couple and uncouple the joint without replacement of the sealing ring.

Where my improved coupling is used for connecting the sections of pipe wherein oil or similar fluids are transmitted, the oil has access to the thin edge of the sealing member by way of the space between the outer surface of the pipe section 28 and the inwardly directed flange 12 on the other pipe section. Oil has a deleterious effect upon rubber and tends to destroy the resiliency or life of the rubber. The oil will first attack the very thin edge of the rubber portion of the sealing ring and gradually destroy the resiliency and life of this edge, with the result that this edge portion will flow into the frusto-conical space 50 indicated in Figure 2 and thereby relieve the compression on that part of the sealing ring immediately behind this edge portion. This action of the oil on the rubber sealing ring is progressive and may in time completely destroy the seal created by the sealing ring.

In order to materially retard or prevent altogether this deleterious action of the oil on the rubber sealing ring I have illustrated in Figure 3 a modified form of sealing ring 24a having its thin edge protected by a metal annulus 52 formed of a plurality of individual U-shaped wires 54 (Figure 4). In manufacturing the sealing ring 24a the annulus 52 is first formed by bending the individual wires 54 into the shape shown and arranging them as an annulus of the desired shape. The individual wires 54 may be coated with rubber cement or other suitable material to cement them together in this annular formation. The annulus 52 is then inserted in a mold in which the rubber portion 32a is formed, and during this molding operation the rubber coating of the wires 54 merges with and becomes a part of the rubber portion 32a. The ring 24a is then completed by the application of the metal base 34.

Where my coupling is applied to pipe sections used to conduct oil or other fluids which attack rubber, a sealing ring like that disclosed in Figure 3 may be used in lieu of the sealing ring 24 of Figures 1 and 2 in order materially to prolong the effective life of the coupling. In the assembled coupling the spaces between the radially outward ends of the individual wires 54 are extremely small or may be practically eliminated, so that the action of the oil on the rubber portion of the sealing ring is extremely slow. Furthermore, the spaces between the individual wires 54 are so small that the rubber portion of the sealing ring will not be extruded therethrough even when this portion is materially affected by the action of the oil thereon.

I have found that the U-shaped cross section of the metal annulus 52 is particularly advantageous in that the flexibility provided by this particular cross section permits the edges of the annulus to be compressed towards each other to a certain extent as the sealing ring is forced down into the tapered space between the conical surface 14 and the external cylindrical surface of the pipe section 28. This permits the sealing ring to adjust itself more completely to these surfaces and also results in closing the spaces between the individual wires 54 and thereby minimizes the effect of the oil on the rubber portion of the sealing ring.

In Figures 5 and 6 I have illustrated a further form of sealing ring having a protective metal annulus enclosing the thin edge of the rubber portion of the sealing ring. In this embodiment of my invention the sealing ring 24b has the thin edge of its rubber portion 32b protected by a metal annulus 56 formed as indicated in Figure 6 by bending a wire 58 back and forth upon itself. The metal strip thus formed is then bent into a U-shaped cross section and thereafter is closed upon itself to form an annulus. This annulus is molded into the sealing ring in the same manner as the annulus 52 previously described.

In Figure 7 I have illustrated a metal annulus 60 of U-shaped cross section. This annulus 60 is formed of individual flat strips 62 and is essentially the same as the annulus 52 of Figures 3 and 4 except that the flat strips 62 are substituted for the wires 54.

In Figure 8 I have indicated another method of forming the protective metal annulus for the sealing rings. In this figure, I have shown a flat strip of metal 64 having slots 66 and 68 punched into the strip. The slots 66 extend inwardly from one edge of the strip and alternate with the slots 68 which extend inwardly from the other edge of the strip. After the strip has been thus punched it is bent substantially upon its center line so that it has a U-shaped cross section, and thereafter the ends of the strip are brought together to form an annulus which may be used in the same way as and in lieu of the annulus 52 shown in Figures 3 and 4.

While I have illustrated my novel pipe coupling as connecting two pipe sections, it is to be understood that my novel coupling may be used to connect a pipe section to a fitting or appliance of any kind or may, in fact, be used wherever a seal of the type disclosed is desirable. It is to be further understood that my invention is not limited to the particular forms illustrated in the drawings, but that my invention may assume numerous other forms and that the scope of my invention is defined solely by the following claims.

I claim:

1. A pipe coupling comprising a pipe section having a conical surface, a second pipe section having an external cylindrical surface lying within said conical surface, a resilient sealing ring having a spherical surface for engaging said conical surface and a conical surface for engaging said cylindrical surface, whereby upon application of light pressure to the said sealing ring two zones of substantially line contact will be set up on opposite sides of said sealing ring, and clamping means for forcing said sealing ring into engagement with said pipe sections.

2. A sealing ring comprising a tapered resilient portion having a spherical outer sealing surface and a conical inner sealing surface and adapted to be disposed between bell and spigot sections of a pipe joint and making substantially line contact on opposed surfaces of the ring with the walls of said sections.

3. A sealing ring comprising a tapered rubber portion and a protective metal annulus of U-shaped cross-section secured to the thin edge of the rubber portion, said metal annulus being formed of a strip of metal provided with alternate slots extending inwardly from its opposite edges, said slots being of such length as to extend almost from edge to edge of the metal annulus.

CHARLES E. NORTON.